Figure 1:
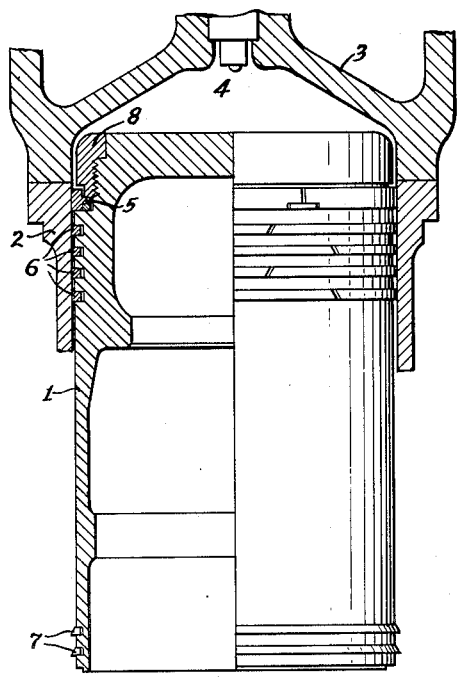

Dec. 4, 1951      H. LIEBERHERR      2,577,022

PISTON RING

Filed May 25, 1946      2 SHEETS—SHEET 1

INVENTOR
*Hans Lieberherr*

BY
*Pennie, Edmonds, Morton and Barrows*

ATTORNEYS

Dec. 4, 1951          H. LIEBERHERR          2,577,022
PISTON RING
Filed May 25, 1946          2 SHEETS—SHEET 2
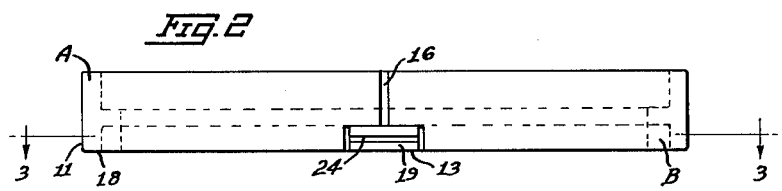
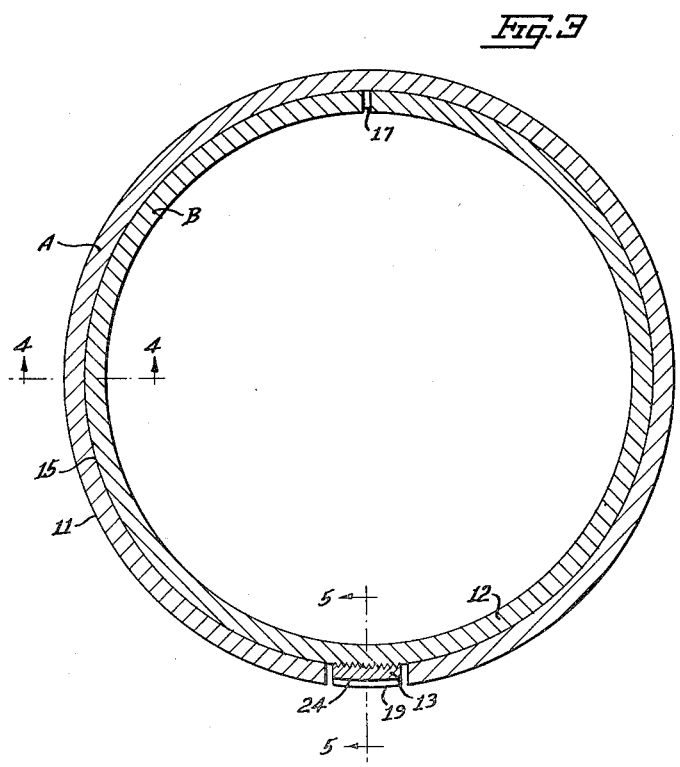
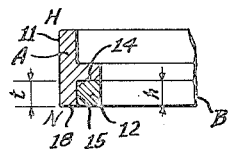 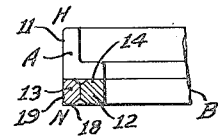
INVENTOR
*Hans Lieberherr*
BY
ATTORNEYS Patented Dec. 4, 1951

2,577,022

UNITED STATES PATENT OFFICE 2,577,022

PISTON RING

Hans Lieberherr, Winterthur, Switzerland, assignor to Sulzer Freres, Société Anonyme, Winterthur, Switzerland Application May 25, 1946, Serial No. 672,200
In Switzerland November 22, 1945

4 Claims. (Cl. 309—29)

The invention relates to a reciprocating engine, the piston of which carries a gas-tight packing means in a single stage at the point where it is subjected to the highest pressure, and which may also carry other not fully gas-tight reserve or auxiliary packing, supporting, and lubricant-controlling devices on the low-pressure side of the gas-tight packing means. The gas-tight packing means may comprise a built-up piston ring which is cut, as customary in piston rings, to permit its insertion in the piston groove and to give it an outward springing effect when compressed to close the cut. Such a ring may comprise a specially-shaped, outer ring in contact with the cylinder wall and an inner ring between a special portion of the contact ring and the piston, said inner ring being assembled on the piston with its "cut" well out of register with the "cut" in the contact ring and bearing on its outer periphery means to seal the contact ring "cut."

In engines whose pistons must be rendered gas-tight at their contact with the cylinder, particularly if they work with high mean effective pressures and high temperatures, I have found it desirable to adapt the first ring toward the higher gas pressure alone for rendering the space between cylinder and piston gas-tight. If the sealing action is concentrated in one single ring, gas streams moving at high speeds, such as would occur with the known types of stage or cascade packing, are avoided. Gas flow at high speed between piston and cylinder leads not only to destruction of the lubricating films necessary for reliable service, but also to oxidation of the lubricating means. Because of the presence of the decomposed products of oxidation in the lubricating means, on the other hand, it has been found by experience that the lubricating effect is practically destroyed all together and the mechanical wear of the metal parts sliding on each other is increased many times.

In order to avoid the high gas speeds between cylinder and piston which occur with the usual stepped method of packing with several piston rings, I have found that a specially shaped built-up piston ring is especially effective and I shall illustrate and describe my invention with particular reference to this preferred gas-tight packing means. The action of this preferred single-stage packing means, because of its special shape, is analogous to that of a cup-leather, the sealing action of the spring force of the ring being reinforced by the pressure of gases behind it, especially as its shape becomes cone-like under the differential temperatures to which it is exposed under operating conditions.

In reciprocating internal engines of the opposed-piston type, it is easily possible to obtain a wedge-shaped gap between the sliding surface of such a piston ring and the sliding surface of the working cylinder when the engine is running, the wider end of the wedge being directed to the side where pressure is lower. Such a wedge-shaped gap has in every instance proved favorable since it allows lubricating oil to enter when the piston is moving outwards and thus creates a supporting, and at the same time sealing, film of oil.

The creation of this wedge-shaped gap is mainly dependent on two conditions: On the one hand it is necessary to adopt a piston ring which is formed in the shape of a cup and has particularly careful joint sealing. A piston ring of this kind is herein described. Such a ring, subjected to the combustion heat at the side of higher pressure, shows a tendency to open there and consequently allow the above mentioned wedge-shaped gap to form. On the other hand it is necessary to adopt a cylinder whose sliding surface remains approximately cylindrical in service and accordingly is not widened like a goblet in the neighborhood of the combustion space by the very high heat stressing occurring there. In fact, if the cylinder were to widen out like the cup-shaped ring, the running surfaces of the ring and the cylinder would tend to lie flat on each other, and thus the wedge-shaped groove, which is extremely important for the lubrication, would completely disappear. A cylinder of the required kind for opposed piston engines is described in U. S. Patent No. 2,193,884.

The special kind of cooling provided there, however, cannot be used or be adopted with its full effect, if, instead of to an opposed-piston engine, it were to be fitted in a single-piston engine with cylinder head. Then the sealing required between the cylinder and the head makes it difficult to bring the cooling medium sufficiently close to the inner surface of the cylinder. In consequence, the edge of the cylinder facing the cylinder head becomes too hot, expands, widens the upper part of the cylinder in the form of a goblet and therefore makes it impossible for the wedge-shaped gap to be formed exactly at this important part.

The present invention provides a remedy. It is characterised by the combination of a piston carrying a sealing device for gases, which device has, on the side of the higher gas pressure, a piston ring, which consists of an element with cup-shaped cross-section directed towards the combustion space to be sealed and a second element coming into action as joint sealing for the first element and, on the side of the lower gas pressure, at the most additional simple rings, with a cylinder which has a heat protecting ring in the neighborhood of the inner dead centre position of that cup-shaped ring.

By adopting this combination, the particularly favorable wedge-shaped gap can now be obtained also in cases in which the method of cooling described in U. S. Patent No. 2,193,884 cannot be adopted at all or not to its full effect. If, for instance, the described joint sealing were to be omitted from this combination, even retaining a heat protecting ring, of itself old the full effect of the invention would be lost, since the ring without joint sealing must leak at one position of its periphery. At that position it would also be considerably heated in the lower part, so that the wedge-shaped widening could no longer arise.

A further improvement would, at first impression, be expected if the cup-shaped piston ring were arranged as deep as possible, i. e. as far as possible away from the crown of the piston. For, the deeper the ring is arranged, the less it will enter into the possibly still remaining goblet-shaped widening of the cylinder, the better consequently will the condition be fulfilled that the ring shall be only in contact with the parts of the working cylinder which remain cylindrical. By simply following this rule, however, the contrary of what is intended would be obtained. For the more deeply arranged ring would be withdrawn from contact with the combustion heat, it would consequently not widen any more, and the wedge-shaped gap would therefore no longer arise.

Therefore a further provision of the preferred combination of this invention consists in that additionally the crown of the piston has a tapered form, at least towards the periphery, and the heat protecting ring at the inner dead centre position of the piston is formed projecting over this tapered surface. This has the consequence that the cup-shaped ring, although deeply arranged, remains still subject to contact with heat from the combustion space. Only in this way does the improvement become fully effective.

A further improvement is obtained in that, additionally the sliding surface of the cup-shaped element of the ring in circular form has a diameter which in the non-heated state of the engine is at least one percent less than the internal diameter of the cylinder taking the piston. The reason for this is as follows: The cut ring—in so far as it, as is here the case, lies with its under surface on a circle—behaves almost exactly like a continuous ring in the parts of its periphery lying at a distance from the ring joint. It will therefore be not only deformed cone-like by the axial components of a current of heat flowing through it, but also will exert considerable resistance against return into the cylindrical shape. The joint of the cut ring, however, interrupts the continuity, and the ends of the ring adjoining the joint can be turned comparatively easily round the tangent to the ring and consequently exert only a slight resistance to return into the cylindrical shape. On the other hand the radial component of the current of heat flowing through the ring deforms a cut ring, in contrast to a continuous ring, very considerably in the sense that it opens the ring. A ring, which is cut, built into the cylinder and lying with its under surface on a circle, is consequently distorted cone-like by the axial component of the heat current exactly like a continuous ring. The radial component of the heat current, however, opens it and increases the pressing-on, particularly of the ends of the ring; this pressing-on turns the ends round the ring tangent, consequently making it difficult or impossible that the wedge-shaped gap arises even at the ends of the ring. With described dimension-ratio, however, the result is contrary to this, in that it diminishes the pressing-on of the ends of the ring so much, that the wedge-shaped gap arises there also.

Figure 6:
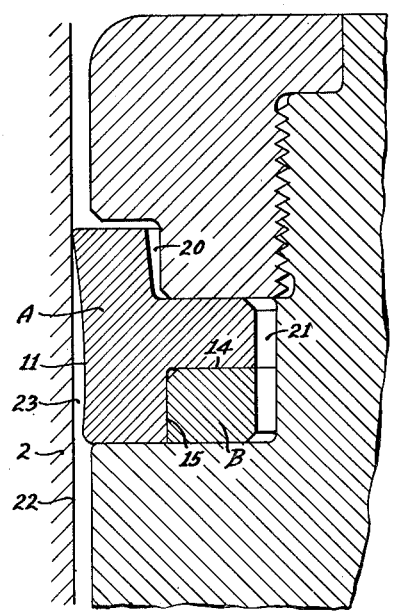
Figure 7:
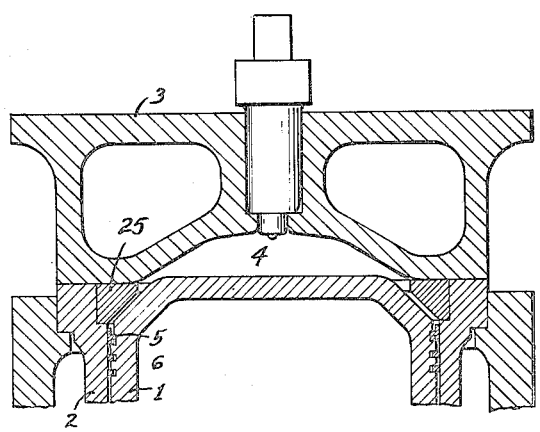
Figure 8:
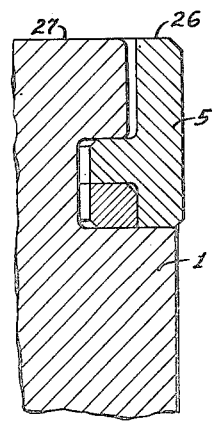

Several embodiments of the invention are explained below with the help of the drawings in which, Fig. 1 is an elevation partially in section of a piston and a portion of the associated cylinder of a reciprocating engine according to the invention, Fig. 2 is an elevation of the gas-tight packing device used in the preferred embodiment of my invention, Fig. 3 is a section on the line 3—3 of Fig. 2, Fig. 4 is a section on the line 4—4 of Fig. 3, Fig. 5 is a section on the line 5—5 of Fig. 3, Fig. 6 is an enlarged partial section through a piston carrying the gas-tight packing of Figs. 2–5 as illustrated in Fig. 1 when in operation, Fig. 7 shows a further embodiment in section with a heat protecting ring held by the cylinder, and Fig. 8 is an enlarged partial section through a piston applying the preferred packing device of Figs. 2–5 in the simplest way.

The piston 1 (Fig. 1), in the cylinder 2 of an internal combustion engine in its upper dead centre as shown, forms with the cylinder head 3 the combustion space 4. As gas-tight packing means preventing combustion gases flowing through, a specially shaped ring 5 consisting of two elements is provided. Four incompletely sealing rings 6 are provided as reserve or auxiliary packing. The rings 6 do not come into action as long as the specially shaped ring 5 keeps tight. They serve solely as a standby in case of leakage past the main ring 5, for instance in consequence of a change in load until the new steady temperature state has been reached, or in case of mechanical damage to the main ring. On the lower part of the piston, in addition, oil scraper rings 7 are provided, and on the upper part a heat protecting ring 8.

The piston ring 5 shown in Fig. 1 is, as illustrated in Figs. 2–5, composed of two elements A and B, both of which are "cut" and outwardly springing. The element A carries the contact surface 11, and may be regarded as roughly T-shaped in cross-section, with the surface 11 forming the top surface of a relatively elongated cross-member. The element B acts as joint packing and is located in the lower recess formed by cross-member and upright of element A.

To form a ring joint, the contact element A is divided at the spot 16 along the meridian plane 5—5, so that it can lie with its sliding surface 11 in a springing manner on the sliding surface of the cylinder. The packing element B laid in the recess of the element A has an annular part 12 and a tongue shaped part 13 covering the joint in element A at 16. This element is made of a metal with a greater strength than the metal of sliding element A. The recess in the contact element A has the continuous horizontal limiting surface 14 reaching to the contact surface 11 only in the neighborhood of the ring joint. Elsewhere the surface 14, on the lower side of the upright of the T only reaches the inside surface of the cross-member. The recess in the element A is also bounded by a cylindrical limiting surface 15 extending downward towards the side where pressure is lower. The height $h$ of the packing element B is equal to the depth $t$ of the surface 15 of the recess in the contact element A. The packing element B is then set into the recess of the element A in such a way that its tongue-like member 13 is in contact in the region of the ring joint 16 not with the cylindrical surface 15 of the recess in element A, but with the contact surface of the cylinder by means of the surface 19. In order to ensure the same wear on the sliding surface 19 as on the sliding surface 11 of the element A, the sliding surface 19 is provided with a groove 24 where necessary to compensate for greater wear resistance in surface 19 by an increase in its bearing pressure. In order to ensure even bearing on the cylindrical surface 15, the element B is "cut" at the spot 17 and inserted with flexible prestressing into the recess in the contact element.

In the region of the normal cross-section of the ring 4—4 (Figs. 3 and 4), the sealing between the high-pressure side H and the low-pressure side N is effected on the one hand by the contact surface 11 and on the other hand by the under flat surfaces 18 of the elements A and B. In the zone of the "cut" 16 (section 5—5, Figs. 3 and 5) the sealing is effected on the contact surface 19 and on the flat surface 18 of the tongue 13. The built-up ring 5 has consequently in the region of the ring joint no spot where sealing is not ensured by one or other of the surfaces. It is consequently not possible that pressure gas could flow through at a high speed from the high-pressure side H through any opening to the low-pressure side N.

In service the contact element A is pressed against the running surface 22 of the cylinder 2 by the gas pressure forcing its way into the intermediate spaces 20 and 21 (Fig. 6). In addition to that, the element A is slightly deformed in so far that one part, i. e. the upper part, has a higher temperature and therefore expands more than the lower part of the ring. Between the contact surface 11 of the built-up ring 5 and the running surface 22 of the cylinder 2, a wedge-shaped intermediate space 23 is consequently formed in which a good supporting oil film can form during the greatest stressing in the outward stroke.

The ring is subjected to the heat of the combustion gases on the one hand on its upper front surfaces, but on the other hand also on its inner surfaces, since the combustion gases enter also into the spaces 20 and 21. Consequently a current of heat flows through the ring and has both an axial component directed in the figure from above to below, and also a radial component directed in the figure from the right to the left. The axial component gives the ring the tendency to distort cone-like. Since the gas pressure presses the lower surface of the ring firmly on to the piston and holds it flat, the lower part of the ring cannot follow this tendency. The cup-shaped lengthening on the other hand, which passes upwards, can follow it, in that, as indicated in the drawing, it bends outwards. In this manner, the wedge-shaped gap 23 is formed between the sliding surface 11 of the ring and the sliding surface 22 of the cylinder 2.

In known pistons with a plurality of packing elements arranged one after the other in the form of a cascade, fluttering phenomena have made their appearance. In consequence of the displacements in the run of the pressure between individual rings arising through throttling phenomena at individual rings, the direction of the excess pressure at the individual rings could change, so that the piston ring might be raised for a short time from the running surface of the cylinder. The vibrations thereby caused led to a rapid wear and even to breakage of the rings. Vibration phenomena in the built-up ring 5, composed of the two elements A and B, would, if there was any inclination to it, be damped by the friction at the contact surfaces 14 and 15 of the elements A and B, so that they could not exercise any damaging action.

In the internal combustion reciprocating engine illustrated in Fig. 7, the heat protecting ring 25 is not fixed to the piston 1 as is the heat protecting ring 8 in Fig. 1, but is inserted between the cylinder 2 and the cylinder head 3. This has the advantage that heat cracks in the upper part of the cylinder 2 can be prevented. Prevention of these heat cracks contributes in its turn to protect the built-up ring 5 which alone serves to render the piston gas tight.

The piston shown in Fig. 8 has a single packing for the pressure gases, a built-up piston ring 5 consisting of two elements A and B, this ring being shaped like the ring in Figs. 2–5. The end face 26 of the contact element A on the built-up ring 5, facing the side with higher pressure, is arranged at the same height as the piston crown 27. Tests have shown that with such an arrangement very good tightening action is to be expected. In Fig. 8 the ring 5 has a still more advantageous form and position for the wedge-shaped gap to arise, in that on the one hand the cup-shaped part is still longer, and on the other hand its upper end surface 26 is approximately at the same height as the neighboring parts 27 of the crown of the piston 1. The end surface is therefore subjected directly to the heat of the combustion space, so that, in contrast to the arrangement in Fig. 6, the axial component of the heat current is considerably strengthened, and therefore also the widening (not illustrated in Fig. 8) of the upper cup-like part of the ring 5.

It is evident that with the arrangement of the ring according to Fig. 6 a relatively small goblet-shaped widening of the upper end of the working cylinder 2 will make the occurrence of the wedge-shaped gap 23 impossible, but that on the other hand with the arrangement according to Fig. 8 the goblet-shaped widening of the working cylinder must reach considerably greater amounts in order to produce this detrimental action.

In Fig. 7, the upper end of the cylinder 2 is protected against the action of heat from the combustion gases by a heat-protecting ring 25, so that a goblet-shaped widening of the upper end of the cylinder 2 is to a large extent prevented. In addition to the cup-shaped ring 5, only two simple rings 6 are arranged on the piston 1. The occurrence of the wedge-shaped gap (23 in Fig. 6) is additionally favored in that the crown of the piston has a cone-shaped form towards the periphery and with the help of this it is possible to arrange the ring 5 still deeper than is illustrated in Fig. 6, but nevertheless to have its upper end face subjected to the heat of the combustion gases somewhat in the same manner as in Fig. 8. Further the heat-protecting ring 25 is formed projecting over this conical surface, which is of benefit to its radial thickness and thereby particularly to the protecting action which it has on the cylinder 2.

Preferably the contact element A is made of cast iron, whilst the element B coming into action only as joint packing can be made of steel, malleable iron or bronze. When made of steel, it is advisable to have it nitrided. The tongue 19 of the element B, coming into action as joint packing only, may be made by fixing a piece on by means of welding.

I claim:

1. A built-up piston ring for use in a reciprocating engine including a cut ring having a cross-section in the shape of a T with a relatively elongated cross-member the upper surface of which is the cylinder contact surface of the ring, the arm of said cross-member extending toward the low-pressure side of the ring being removed adjacent the cut through the ring so that the surface of the T-upright facing the low-pressure side of the ring extends in an unbroken plane for a short distance on each side of the cut to the cylinder contact surface and a discrete packing member cooperating with said cut ring to seal the cut therethrough against gas passage from the high pressure side of the ring.

2. A built-up piston ring according to claim 1 in which the discrete packing member is a second cut ring fitted into the recess formed in the T-shaped ring by the upright thereof and the arm of the cross-member thereof extending toward the low-pressure side, the height of said second ring being equal to the length of said arm, said second ring carrying on its outer surface away from the cut through it a tongue member extending through the removed portion of said arm with its surface on the high-pressure side in contact with the unbroken plane surface of the upright of said T-shaped ring on both sides of the cut therein and its outer surface forming a cylinder contact surface.

3. In a reciprocating engine including a cylinder, a piston, and sealing means for rendering the sliding contact between piston and cylinder gas-tight the improvement which includes, in combination, a built-up piston ring, as the sealing means element nearest the piston crown, said built-up ring having as one element a cut ring in circumferential sliding contact with the cylinder and as another element a member disposed to seal the joint of the sliding element, the sliding element being shaped to utilize the pressure on the high pressure side thereof to maintain a continuous gas-tight seal during operation through the combined action of both elements, and a heat protecting ring affixed to the inside of the cylinder wall in the neighborhood of the upper dead center position of said built-up ring.

4. The combination of claim 3 in which the crown of the piston has a tapered form, at least toward the periphery, and the heat protecting ring is formed projecting over this tapered portion when piston is at upper dead center position.

HANS LIEBERHERR.

REFERENCES CITED

The following references are of record in the file of this patent:

UNITED STATES PATENTS

| Number | Name | Date |
| --- | --- | --- |
| 1,186,980 | Gill | June 13, 1916 |
| 1,264,012 | Chatain | Apr. 23, 1918 |
| 1,458,207 | Brenner | June 12, 1923 |
| 1,770,732 | Carter et al. | July 15, 1930 |
| 1,970,892 | Kirn et al. | Aug. 21, 1934 |
| 2,349,917 | Starr | May 30, 1944 |

FOREIGN PATENTS

| Number | Country | Date |
| --- | --- | --- |
| 302,741 | Great Britain | Dec. 27, 1928 |
| 379,938 | Great Britain | Sept. 8, 1932 |
| 98,398 | Sweden | Mar. 19, 1940 |